(12) United States Patent
Cecil

(10) Patent No.: US 6,278,077 B1
(45) Date of Patent: Aug. 21, 2001

(54) WELD INDEXING METHOD AND SYSTEM

(76) Inventor: Dimitrios G. Cecil, 4370 Charing Way, Bloomfield Hills, MI (US) 48304

( * ) Notice: Subject to any disclaimer, the term of this patent is extended or adjusted under 35 U.S.C. 154(b) by 0 days.

(21) Appl. No.: 09/453,121

(22) Filed: Dec. 2, 1999

(51) Int. Cl.[7] .................................................. B23K 11/24
(52) U.S. Cl. ....................... 219/86.41; 219/86.7; 901/42
(58) Field of Search .................... 219/86.7, 110, 219/86.41; 901/42

(56) References Cited

U.S. PATENT DOCUMENTS

| | | |
|---|---|---|
| 3,433,921 | 3/1969 | Peterson . |
| 3,435,871 | 4/1969 | Johnson . |
| 4,020,316 | 4/1977 | Schaft et al. . |
| 4,028,522 | 6/1977 | Chihoski et al. . |
| 4,296,304 | 10/1981 | Defourny . |
| 4,317,980 | 3/1982 | Goodrich et al. . |
| 4,441,006 | 4/1984 | Machida et al. . |
| 4,447,700 | 5/1984 | Cohen . |
| 4,461,944 | 7/1984 | Cohen . |
| 4,542,277 | 9/1985 | Cecil . |
| 4,609,805 | 9/1986 | Tobita et al. . |
| 4,684,778 | 8/1987 | Cecil . |
| 4,841,113 | 6/1989 | Hamada et al. . |
| 4,861,959 | 8/1989 | Cecil . |
| 4,970,361 | 11/1990 | Fuse . |
| 4,984,171 | 1/1991 | Tsujii . |
| 5,194,709 | 3/1993 | Ichikawa et al. . |
| 5,220,145 | 6/1993 | Cecil et al. . |
| 5,225,647 | 7/1993 | Dufrenne . |
| 5,248,869 | 9/1993 | Debell et al. . |
| 5,258,598 | 11/1993 | Alborante . |
| 5,288,968 | 2/1994 | Cecil . |
| 5,321,225 * | 6/1994 | Boyer .................................. 219/110 |
| 5,360,156 | 11/1994 | Ishizaka et al. . |
| 5,376,766 | 12/1994 | Higgins . |
| 5,393,950 | 2/1995 | Killian . |
| 5,412,172 | 5/1995 | Ichikawa et al. . |
| 6,124,693 * | 9/2000 | Okanda et al. .......................... 901/42 |

FOREIGN PATENT DOCUMENTS

| | | |
|---|---|---|
| 54-27183 | 5/1975 | (JP) . |
| 6-106360 | 4/1994 | (JP) . |

OTHER PUBLICATIONS

A.E. Bentley, Control of Pinch Welding Uses Quantitative Feedback Theory, *Welding Journal*, Jun. 1991, pp. 51–63, Livermore, California.

(List continued on next page.)

*Primary Examiner*—Clifford C. Shaw
(74) *Attorney, Agent, or Firm*—Brooks & Kushman P.C.

(57) ABSTRACT

A welding method and system for welding a workpiece at weld locations includes a weld controller having control logic and stored data related to weld locations and workpiece dimensions. The weld controller is operable with a displacement sensor for monitoring the displacement between the electrodes of a weld gun. The control logic is programmed to generate a move signal based upon the stored data and the displacement between the electrodes. The weld controller also has stored data related to primary and alternate weld locations. The control logic is programmed to generate a fault signal based upon the stored data and a welding parameter such as the displacement between the electrodes. The weld controller provides a fault signal to the position controller to index the weld gun from a primary weld location to an alternate weld location when a comparison of the welding parameter to stored data related to the primary weld location indicates that the workpiece has been improperly welded.

22 Claims, 3 Drawing Sheets

OTHER PUBLICATIONS

C.L. TSAI, O.A. Jammal, J.C. Papritan and D.W. Dickinson, Modeling of Resistance Spot Weld Nugget Growth, *Welding Research Supplement*, Feb. 1992, pp. 47–54.

David Bacon, Controlling Resistance Welds With Deflection Feedback, pp. 1–8, Square D. Company, Sep. 11, 1991.

C.L. TSAI, W.L. DAI, D.W. Dickinson and J.C. Papritan, Analysis and Development of a Real–Time Control Methodology in Resistance Spot Welding, *Welding Research Supplement*, Dec. 1991, pp. 339–351.

Ariel Stiebel, Charles Ulmer, Dietrich Kodrack, and Barry B. Holmes, Monitoring and Control of Spot Weld Operations, *SAE Technical Paper Series 860579*, Feb. 1986, pp. 1–17, Warrendale, Pennsylvania.

Chon L. TSAI, Weng L. Dal, and David W. Dickinson, Analysis and Development of A Real–Time Control Methodology in Resistance Spot Welding, *SAE Technical Papers Series 910191* Feb.–Mar. 1991, pp. 1–14, International Congress and Exposition, Detroit, Michigan.

* cited by examiner

WELD INDEXING METHOD AND SYSTEM

TECHNICAL FIELD

The present invention generally relates to welding methods and systems and, more particularly, to a welding method and system in which displacement between electrodes of a weld gun is controlled as the weld gun is being indexed between weld locations which include alternate weld locations associated with primary weld locations.

BACKGROUND ART

A weld gun performs welding operations on metal workpieces. Generally, a weld gun has two electrodes. Workpieces to be welded together at weld locations are inserted between the pair of electrodes of the weld gun. Used herein, the term "workpiece" refers to at least two workpieces, or to portions of a single workpiece, to be welded together.

A robot arm cooperates with the weld gun for moving the weld gun relative to the workpiece. A robot controller controls the robot arm to move the weld gun to various weld locations of the workpiece. The weld controller controls the weld gun to close and move the electrodes toward the workpiece until the electrodes clamp down on the workpiece with a sufficient pressure such that the workpiece is inserted between the electrodes at a first weld location. The weld controller then controls a weld power supply to provide electrical power to the electrodes to effect welding at the weld location. The weld power supply then terminates the electrical power to the electrodes after the workpiece has been welded at the first weld location. The weld controller then controls the weld gun to open, release the pressure applied to the electrodes, and move the electrodes away from workpiece. The robot controller then controls the robot arm to move the weld gun from the first weld location to the second weld location.

Prior to the robot arm moving the weld gun to the second weld location, the electrodes have to be opened a sufficient distance to allow the workpiece to be inserted between the electrodes at the second weld location. If the electrodes are not opened the sufficient distance prior to being moved to the second weld location then the electrodes, the weld gun, the robot arm, and the workpiece may be damaged. After the electrodes have been opened to the sufficient distance the weld gun may be moved to the second weld location. The weld controller then controls the weld gun to close and move the electrodes toward the workpiece until the electrodes clamp down on the workpiece such that the workpiece is inserted between the electrodes at the second weld location. The above described process is then repeated to weld the workpiece at the second weld location.

The workpiece has a thickness at each weld location and a thickness between the weld locations. The thickness of the workpiece may be consistent or vary among the weld locations and between the weld locations. To clamp down on the workpiece at each weld location the electrodes must be moved open a sufficient distance relative to one another to allow the workpiece to be inserted between them. Typically, the weld controller controls the weld gun to move the electrodes between two extreme states, a fully opened state where the electrodes are spaced apart a maximum distance from one another and a closed state where the electrodes are clamped down on a workpiece. The maximum distance between the electrodes in the fully opened state is typically much greater than the thicknesses of the workpiece at the weld locations. A problem with controlling the weld gun to move the pair of electrodes only between two extreme states is that a considerable amount of time is wasted to move the weld gun between different weld locations.

For instance, after welding a first weld location the weld controller controls the weld gun to open and move the electrodes to the fully opened state. The robot controller then controls the robot arm to move the weld gun to the second weld location to effect welding. Considerable time is wasted between opening the electrodes to the fully opened state after welding the first weld location, moving the weld gun to the second weld location, and then moving the electrodes from the fully opened state to the closed state to clamp down on the workpiece at the second weld location. Specifically, after welding the first weld location the electrodes are opened to a distance much greater than the thickness of the second weld location. This wastes time as the electrodes only need to be moved away from each other at a distance large enough such that the electrodes can clamp down on the workpiece at the second weld location, i.e., a distance large enough such that the workpiece can be inserted between the electrodes at the second weld location.

Prior art weld and robot controllers are also configured to use programmed time delays to ensure that the electrodes are opened a sufficient distance with respect to one another before the weld gun is moved between different weld locations. The prior art weld controllers wait a programmed squeeze cycle delay while the electrodes are closing and moving towards the workpiece to clamp down on the workpiece at a weld location prior to initiating weld power. Electrical power is applied to the electrodes to effect welding at the weld location after the squeeze cycle delay. After the workpiece has been welded at the weld location, the prior art robot controllers wait a programmed open gun cycle delay while the electrodes open and move away from the workpiece at the weld location. The prior art robot controllers then move the weld gun to the next weld location. The problem with using the programmed delays is that the delays are typically conservative to allow enough time for the electrodes to move toward and away from the workpiece prior to initiating weld power at a weld location and prior to moving the weld gun between weld locations.

What is needed is a welding method and system in which a weld controller opens the electrodes of a weld gun just enough after welding a first weld location of a workpiece to clamp the workpiece at a second weld location prior to moving the weld gun from the first weld location to the second weld location.

A further problem with typical weld controllers, and welding operations in general, is that the weld controllers have no backup plan if a weld location is improperly welded. What is needed is a welding method and system in which a weld controller moves the weld gun from a primary weld location to an associated alternative weld location when the workpiece has been improperly welded at the primary weld location.

SUMMARY OF THE INVENTION

Accordingly, it is an object of the present invention to provide a welding method and system in which a weld gun is indexed from a first weld location to a second weld location as soon as the electrodes of the weld gun have opened a predetermined amount sufficient to clear the workpiece when indexing between the weld locations.

It is a further object of the present invention to provide a welding method and system in which a weld controller stores data related to weld locations and workpiece dimensions and indexes a weld gun from a first weld location to a second weld location as soon as a comparison of the displacement between the electrodes of the weld gun and the stored data related to the first weld location indicates that the electrodes have opened a predetermined amount sufficient to clear the workpiece when indexing between the weld locations.

It is another object of the present invention to provide a welding method and system in which a weld controller stores data related to weld locations and workpiece dimensions and generates a move weld gun signal to index a weld gun from a first weld location to a second weld location as soon as a comparison of the displacement between the electrodes of the weld gun and the stored data related to the first weld location indicates that the electrodes have opened a predetermined amount sufficient to clear the workpiece when indexing between the weld locations.

It is still another object of the present invention to provide a welding method and system in which a weld controller stores data related to weld locations and workpiece dimensions and generates an open weld gun signal to open a weld gun when a comparison of the displacement between the electrodes of the weld gun and the stored data related to the weld location indicates that the electrodes have improperly engaged the workpiece.

It is still another object of the present invention to provide a welding method and system in which a weld controller stores data related to weld locations and workpiece dimensions ns and generates an open weld gun signal to open a weld gun when a comparison of the displacement between the electrodes of the weld gun and the stored data related to the weld location indicates that the electrodes have improperly engaged the workpiece.

It is yet a further object of the present invention to provide a welding method and system in which a weld controller stores data related to weld locations and workpiece dimensions and generates a terminate weld signal to a weld power supply for terminating welding power to the electrodes of a weld gun as soon as a comparison of the displacement between the electrodes with stored data related to the weld location indicates that the workpiece has been properly welded.

It is yet still another object of the present invention to provide a welding method and system in which a weld controller stores data related to obstacle locations on a workpiece and obstacle dimensions and generates a move weld gun signal to index a weld gun from a first weld location to a second weld location as soon the electrodes have opened an amount sufficient to clear the obstacles when indexing between weld locations.

Further, it is an object of the present invention to provide a welding method and system in which a weld gun is indexed from a primary weld location to an alternative weld location as soon as a comparison of the displacement between the electrodes to stored data related to the primary weld location indicates that the workpiece has been improperly welded at the primary weld location.

Further, it is another object of the present invention to provide a welding method and system in which a weld controller stores data related to primary and alternate weld locations and generates a move weld gun signal to index a weld gun from a primary weld location to an alternate weld location as soon as a comparison of the displacement between the electrodes of the weld gun and the stored data related to the primary weld location indicates that the electrodes have opened a predetermined amount sufficient to clear the workpiece when indexing from the primary weld location to the alternate weld location.

Further, it is still another object of the present invention to provide a welding method and system in which a weld controller stores data related to primary and alternate weld locations and workpiece dimensions, and generates a move weld gun signal to index a weld gun from a primary weld location to an alternate weld location as soon as a comparison of the displacement between the electrodes of the weld gun and the stored data related to the primary weld location indicates that the electrodes have opened a predetermined amount sufficient to clear the workpiece when indexing from the primary weld location to the alternate weld location.

Further, it is still yet a further object of the present invention to provide a welding method and system in which a weld controller provides a weld gun actuator signal to a weld gun actuator for opening and closing the electrodes as the weld gun is indexed to the next weld location such that the displacement between the electrodes varies as a function of the position of the weld gun with respect to the workpiece.

In carrying out the above objects and other objects, the present invention provides a welding system for welding a workpiece at a plurality of weld locations. The system includes a weld gun having a pair of displaceable electrodes. A sensor is operable with the weld gun for generating a displacement signal indicative of displacement between the electrodes. A weld gun actuator closes the electrodes to engage the workpiece and opens the electrodes to disengage the workpiece at a weld location. A position controller moves at least one of the weld gun and the workpiece such that the weld gun moves relative to the workpiece to index to each of the weld locations. A weld power supply applies welding power to the electrodes to effect welding of the workpiece at the weld location.

A weld controller has control logic and stored data related to weld locations and workpiece dimensions. The weld controller is operable with the sensor for monitoring the displacement between the electrodes as a function of the displacement signal. The control logic is programmed to generate a move weld gun signal and a terminate weld signal based upon the stored data and the displacement between the electrodes. The weld controller provides a terminate weld signal to the weld power supply for terminating welding power to the electrodes as soon as a comparison of the displacement between the electrodes with stored data related to the weld location indicates that the workpiece has been properly welded. The weld controller compares the displacement signal as the electrodes open to stored data related to the weld location and provides a move weld gun signal to the position controller for indexing the weld gun to the next weld location as soon as the electrodes have opened a predetermined amount sufficient to clear the workpiece when indexing to the next weld location.

Preferably, the control logic is programmed to generate an open weld gun signal based on the stored data and the displacement between the electrodes. The weld controller provides an open weld gun signal to the weld gun actuator for opening the electrodes to disengage the workpiece when a comparison of the displacement between the electrodes to stored data related to the weld location indicates that the workpiece has been properly welded.

Preferably, the control logic is programmed to generate an open weld gun signal based on the stored data and the displacement between the electrodes. The weld controller provides an open weld gun signal to the weld gun actuator prior to the weld power supply applying welding power to the electrodes for the weld gun actuator to open the electrodes when a comparison of the displacement between the electrodes to stored data related to the weld location indicates that the electrodes have improperly engaged the workpiece.

Preferably, the weld controller has stored data related to obstacle locations on the workpiece and obstacle dimensions. The weld controller compares the displacement signal to stored data related to the obstacle locations and provides a move weld gun signal to the position controller to index the weld gun to the next weld location as soon as the electrodes have opened an amount which was predetermined to be sufficient to clear the obstacles when indexing to the next weld location.

Further, in carrying out the above objects and other objects, the present invention provides an alternative embodiment of the welding system. In the alternative embodiment, the weld controller has control logic and stored data related to primary weld locations and alternate weld locations. Each primary weld location is associated with a respective alternate weld location. The control logic is programmed to generate a fault signal based upon the stored data and the welding parameter. The weld controller provides a fault signal to weld the associated alternate weld location when a comparison of the welding parameter to stored data related to the primary weld location indicates that the workpiece has been improperly welded.

Further, in carrying out the above objects and other objects, the present invention provides a second alternative embodiment of the welding system. In the second alternative embodiment, the weld controller has control logic and stored data related to weld locations and workpiece dimensions. The control logic is programmed to generate a weld gun move signal and a weld gun actuator signal based upon the stored data and the displacement between the electrodes. The weld controller provides a move weld gun signal to the position controller for indexing the weld gun to the next weld location. The weld controller provides a weld gun actuator signal to the weld gun actuator for opening and closing the electrodes as the weld gun is being indexed to the next weld location such that the displacement between the electrodes varies as a function of the position of the weld gun with respect to the workpiece.

The advantages associated with the present invention are numerous. The time required for the weld gun to traverse between two weld locations is minimized because the weld gun moves as soon as the electrodes have opened a predetermined amount sufficient to clear the workpiece when indexing. The required weld gun travel time is also minimized because the displacement between the electrodes of the weld gun varies as a function of the position of the weld gun with respect to the workpiece as the weld gun is being indexed. Weld reliability is ensured as the weld controller moves the weld gun to an alternative weld location associated with a primary weld location when the workpiece has been improperly welded at the primary weld location.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
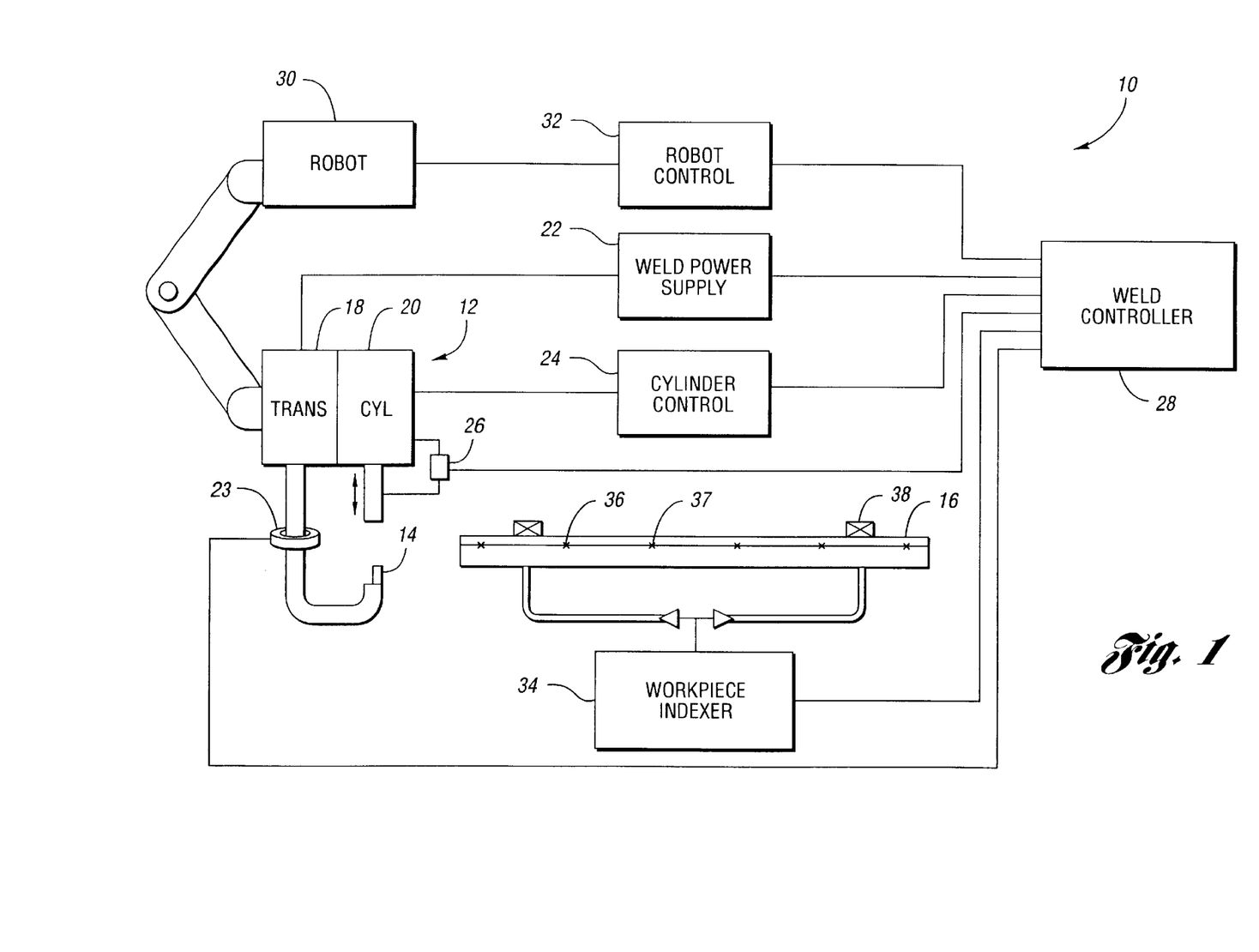
FIG. 1 illustrates a block diagram of a welding system in accordance with the present invention.

Referring now to FIG. 1, a welding system 10 in accordance with the present invention is shown. Welding system 10 includes a weld gun 12 having a pair of displaceable electrodes 14 or a single displaceable weld electrode. Electrodes 14 are displaceable or movable with respect to one another. Electrodes 14 are displaceable towards each other to close and move toward a workpiece 16 to clamp down on the workpiece such that the workpiece is inserted between the electrodes. Electrodes 14 are also displaceable away from each other to open and move away from workpiece 16 and disengage the workpiece. Both of electrodes 14 may be movable or just one of the electrodes may be movable while the other electrode is fixed. Single weld electrode 14 is displaceable or movable with respect to workpiece 16. Single weld electrode 14 is movable to close and move toward workpiece 16 to meet the workpiece. Single weld electrode 14 is also movable to open and move away from workpiece 16 and disengage the workpiece.

Weld gun 12 further includes an electrical power transformer 18 and a cylinder 20. Cylinder 20 is either a pneumatic or electric cylinder. A weld power supply 22 supplies electrical welding power to electrodes 14 via transformer 18. A cylinder control 24 (weld gun actuator) controls cylinder 20 to apply pressure to electrodes 14 such that the electrodes engage workpiece 16 with a desired amount of pressure. Cylinder 20 controls the rate at which the electrodes move with respect to one another. Cylinder 20 may apply differing amounts of pressure to electrodes 14.

Weld gun 12 further includes an electrode displacement sensor 26 operable with electrodes 14 for generating a displacement signal indicative of the displacement between the electrodes. Displacement sensor 26 is a transducer such as a linear variable displacement transducer (LVDT), a laser sensor, and the like. The displacement between electrodes 14 is the space or clearance between the electrodes.

A weld controller 28 processes the displacement signal to monitor the displacement between electrodes 14. Weld controller 28 controls weld power supply 22 to provide power to electrodes 14 as a function of the displacement between the electrodes. Weld controller 28 provides power to electrodes 14 when the displacement between the electrodes is indicative of the electrodes properly engaging workpiece 16. Electrodes 14 properly engage workpiece 14 when both of the electrodes are touching the workpiece with a sufficient amount of pressure. Weld controller 28 inhibits power to electrodes 14 when the displacement between the electrodes is indicative of the electrodes improperly engaging or disengaged from the workpiece. Electrodes 14 improperly engage workpiece 14 when at least one of the electrodes is not touching the workpiece.

Weld controller 28 controls cylinder control 24 to apply pressure to electrodes 14 as a function of the displacement between the electrodes. Weld controller 28 applies pressure to electrodes 14 to clamp down on workpiece 16 with a sufficient force and to maintain the force after weld power has been terminated for a time duration dependent on the displacement between electrodes 14. Weld controller 28 also controls the pressure applied to electrodes 14 as a function of the displacement between electrodes 14 to maintain desired opening and closing velocities of the electrodes while they are moving away from and towards workpiece 16.

A robot 30 cooperates with weld gun 12 to move the weld gun relative to workpiece 16. Robot 30 is capable of three dimensional movement and moves weld gun 12 in any of three dimensions. A robot control 32 moves robot 30. Weld controller 28 controls robot control 32 to move robot 30 and weld gun 12. Weld controller 28 moves weld gun 12 between a plurality of weld locations 36 on workpiece 16. A weld location is the location where the workpiece is to be or has been welded together. Typically, a workpiece has to be welded at a variety of locations to be properly welded together. While workpiece 16 is being welded clamps 38 hold the workpiece together to keep the weld locations and the workpiece properly aligned. Weld controller 28 moves weld gun 12 such that after welding one weld location the weld gun is positioned to weld the next weld location.

A workpiece indexer 34 cooperates with workpiece 16 to move the workpiece relative to weld gun 12. Weld controller 28 controls workpiece indexer 34 to move workpiece 16 relative to weld gun 12 between weld locations 36. Weld controller 28 moves workpiece 16 such that after one weld location has been welded by weld gun 12 the workpiece is moved so that the next weld location is positioned to be welded by the weld gun.

Weld controller 28 has control logic and stored data related to weld locations and workpiece dimensions. The stored data related to the weld locations includes sufficient information to identify the locations on workpiece 16 that are to be welded together. The stored data related to the workpiece dimensions includes the dimensions of the workpiece at the weld locations, i.e., fit up dimensions at the weld locations. Weld controller 38 uses fit up dimension data for each weld location to ensure that electrodes 14 properly engage workpiece 16 at the weld location. The stored data related to the workpiece dimensions further includes the dimensions of the workpiece between each weld location. For instance, a workpiece may have two narrow portions separated by a thick portion. For weld gun 12 to traverse between the two narrow portions electrodes 14 need to be opened far enough to move over the thick portion of the workpiece.

Weld controller 28 further has stored data related to obstacle locations on workpiece 16 and obstacle dimensions. The stored data related to the obstacle locations includes sufficient information to identify the locations of obstacles such as clamps 38 on workpiece 16. The stored data related to the obstacle dimensions further includes the dimensions of clamps 38 along workpiece 16. For instance, a clamp 38 may be located between two weld locations. For weld gun 12 to traverse between the weld locations, electrodes 14 need to be opened far enough to move over clamp 38 between the weld locations.

In general, the control logic of weld controller 28 is programmed to generate control signals for controlling various aspects of the welding operation. The control signals are generated as a function of at least one of the stored data including weld locations, workpiece dimensions, obstacle locations, and obstacle dimensions; the position of weld gun 12 relative to workpiece 16; the displacement between electrodes 14; and other welding parameters. The control signals include a move weld gun signal, an open weld gun signal, a close weld gun signal, a terminate weld signal, a fault gun signal, and a weld gun actuator signal.

Weld controller 28 generates a move weld gun signal to move either weld gun 12 and/or workpiece 16 such that the weld gun and the workpiece are moved relative to one another. To move weld gun 12, weld controller 28 provides a move weld gun signal to robot control 32. To move workpiece 16, weld controller 28 provides a move weld gun signal to workpiece indexer 34. Weld controller 28 generates a move weld gun signal to index weld gun 12 from a first weld location to a second weld location as soon as electrodes 14 have opened a predetermined amount sufficient to clear workpiece 16 when indexing to the second weld location. Weld controller 28 also generates a move weld gun signal to index weld gun 12 between weld locations as soon as electrodes 14 have opened an amount sufficient to clear obstacles 38 as weld gun 12 indexes.

Weld controller 28 generates an open weld gun signal to open electrodes 14. Weld controller 28 provides an open weld gun signal to cylinder control 24 to reverse clamping pressure and move electrodes from a closed position to an opened position. Weld controller 28 provides an open weld gun signal to cylinder control 24 for opening electrodes 14 to disengage workpiece 16 when a comparison of the displacement between the electrodes to stored data related to the weld location indicates that the workpiece has been properly welded or the electrodes have improperly engaged the workpiece.

Weld controller 28 generates a close weld gun signal to close electrodes 14. Weld controller 28 provides a close weld gun signal to cylinder control 24 to apply clamping pressure and move electrodes from an opened position to a closed position. Weld controller 28 provides a close weld gun signal to cylinder control 24 for closing electrodes 14 to engage workpiece 16 at a weld location when a comparison of the position of weld gun 12 with stored data related to workpiece 16 indicates that the weld gun is properly aligned with respect to the weld location.

Weld controller 28 generates a terminate weld signal to terminate welding power to electrodes 14. To terminate the welding power, weld controller 28 provides a terminate weld signal to weld power supply 22. Weld controller 28 provides a terminate weld signal to weld power supply 22 for terminating welding power to electrodes 14 as soon as a comparison of the displacement between electrodes 14 with stored data related to the weld location indicates the workpiece 16 has been properly welded.

Figure 2A:
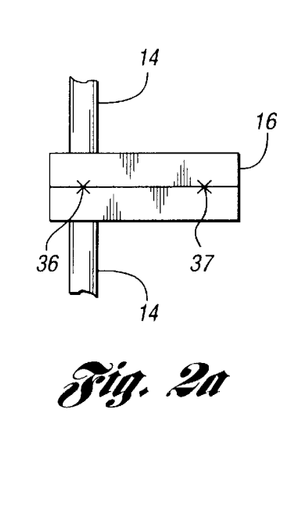
FIGS. 2A through 2E illustrate the general operation of indexing a weld gun having a pair of electrodes in accordance with the present invention.

FIGS. 2A through 2E describe the operation of the open weld gun signal, the move weld gun signal, the close weld gun signal, and the terminate weld signal in greater detail. Initially, electrodes 14 clamp down on workpiece 16 at a weld location 38 as shown in FIG. 2A. Weld power supply 22 then applies power to electrodes 14 to effect welding of workpiece 16 at weld location 36. Weld controller 28 monitors the displacement of electrodes 14 during welding and then generates a terminate weld signal as soon as the displacement indicates that the workpiece has been properly welded. Weld controller 28 provides the terminate weld signal to weld power supply 22 to terminate the weld power to electrodes 14.

Figure 2B:
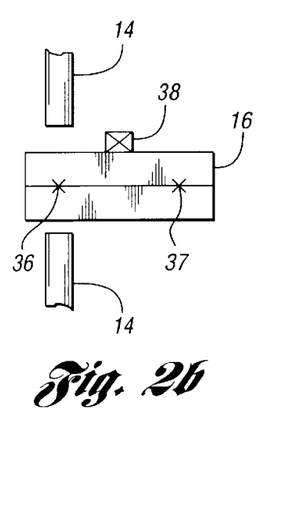

Weld controller 28 then generates an open weld gun signal to cylinder control 24 open electrodes 14 as shown in FIG. 2B. Weld controller 28 generates the open weld gun signal as soon as the displacement between electrodes 14 to stored data related to weld location 36 indicates that workpiece 16 has been properly welded.

Figure 2C:
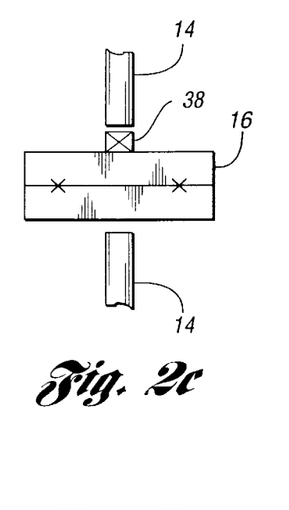

As soon as electrodes 14 have opened a predetermined amount sufficient to clear workpiece 16 when indexing from first weld location 36 to a second weld location 37, weld controller 28 generates a move weld gun signal to index weld gun 12 and electrodes 14 between the first weld location to the second weld location as shown in FIG. 2C. Weld controller 28 also generates a move weld gun signal to index weld gun 12 between weld locations as soon as electrodes 14 have opened an amount sufficient to clear obstacle 38 as weld gun 12 indexes from first weld location 36 to second weld location 37.

Figure 2D:
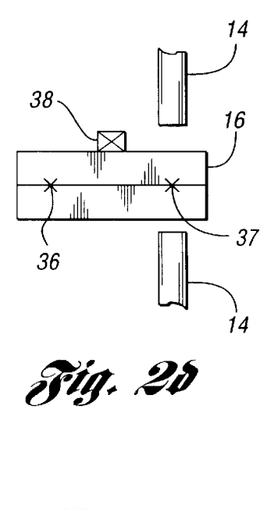
Figure 2E:
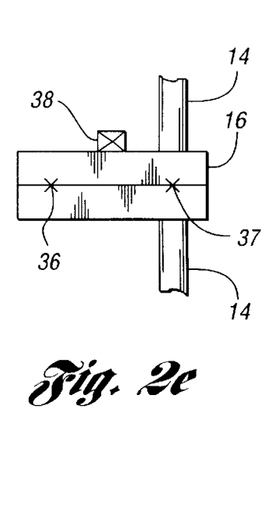

Weld gun 12 indexes from first weld location 36 to second weld location 37. Once weld gun 12 is aligned with respect to second weld location 37, weld controller 28 provides a close weld gun signal to cylinder control 24 to close electrodes 14 as shown in FIG. 2D. Electrodes 14 close to engage workpiece 16 at second weld location 37 as shown in FIG. 2E.

Weld controller 28 generates a fault gun signal based upon the stored data and a welding parameter. The welding parameter may be the displacement between electrodes 14 during welding. The welding parameter may be one or more of different parameters such as the displacement including fit up and set down, the welding power applied by weld power supply 22 during welding including the voltage and the current measured by current sensor 23, the pressure applied by cylinder control 24 to electrodes 14 during welding, and the like. The stored data includes alternate weld locations associated with primary weld locations. Weld controller 28 provides a fault signal to weld an alternate weld location associated with a primary weld location when a comparison of a welding parameter to stored data related to the primary weld location indicates that workpiece 16 has been improperly welded at the primary weld location.

Figure 3:
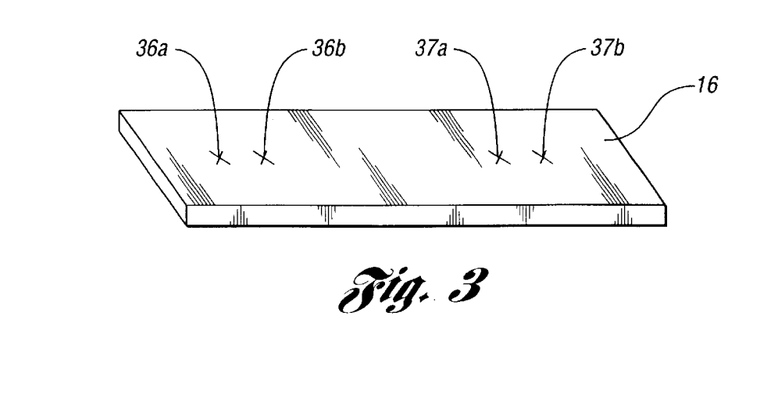
FIG. 3 illustrates primary and alternate weld locations on a workpiece.

FIG. 3 describes the operation of the fault signal in greater detail. Workpiece 16 includes a plurality of primary weld locations such as first primary weld location 36a and second primary weld location 37a. Each of the primary weld locations 36a, 37a includes an associated alternative weld location 36b, 37b. For instance, first primary weld location 36a includes an associated alternative weld location 36b and second primary weld location 37a includes an associated weld location 37b. Weld controller 28 generates a fault gun signal based upon the stored data and a welding parameter. Weld controller 28 provides a fault signal to weld an alternate weld location associated with a primary weld location when a comparison of a welding parameter to stored data related to the primary weld location indicates that workpiece 16 has been improperly welded.

For example, if the welding parameter indicates that workpiece 16 has been improperly welded at primary weld location 36a then weld controller 28 provides a fault signal to weld alternate weld location 36b. Improper welds include edge welds, weak welds, expulsion welds, and the like. Alternate weld location 36b may be welded immediately after primary weld location 36a. In this case, weld gun 12 is indexed with respect to workpiece 16 from primary weld location 36a to alternate weld location 36b in response to the fault signal. After alternate weld location 36a has been welded, weld gun 12 is indexed to primary weld location 37a. Instead, alternate weld location 36a may be welded after all or some of the primary weld locations of workpiece 16 have been welded. In this case, weld gun 12 is indexed with respect to workpiece 16 from primary weld location 36a to primary weld location 37a. After primary weld location 37a has been welded, weld gun 12 is indexed to alternate weld location 36b.

Weld controller 28 generates a cylinder control (weld gun actuator) signal for opening and closing electrodes 14 as a function of the position of weld gun 12 relative to workpiece 16 as the weld gun is indexing between weld locations. Weld controller 28 controls the spacing between electrodes 14 as weld gun 12 is indexing such that the amount of time required for the electrodes to open at a first weld location and then close at a second weld location is minimized. To minimize the travel time, weld controller 28 provides a weld gun actuator signal to cylinder control 24 for opening and closing electrodes 14 as weld gun 12 is being indexed from the first weld location to the second weld location such that the displacement between the electrodes follows a sinusoidal curve.

FIGS. 4A through 4D describe the operation of cylinder control (weld gun actuator) signal in greater detail. Weld controller 28 provides a cylinder control (weld gun actuator) signal to cylinder control (weld gun actuator) 24 for opening and closing electrodes 14 as a function of the position of weld gun 12 relative to workpiece 16 as the weld gun is indexing between weld locations. Weld controller 28 may control cylinder control 24 such that the displacement between electrodes 14 follows a sinusoidal curve as shown in graph 40 of FIG. 4A. In this case, weld gun 12 is initially at a first weld location (wl #1) and the displacement (d1) between electrodes 14 is the thickness of workpiece 16 as the electrodes are clamped down on the workpiece. After electrodes 14 have welded the first weld location (wl #1), weld controller 28 provides an open weld gun signal to open the electrodes. Once electrodes 14 have been opened a distance such that there is a sufficient displacement (d2) between them for weld gun 12 to be indexed properly weld controller 28 provides a move weld gun signal to index weld gun 12 to the second weld location (wl #2).

Weld controller 28 then provides a cylinder control signal to open electrodes 14 as a function of the position of weld gun 12 with respect to workpiece 16 as the weld gun is being indexed. For instance, weld controller 28 controls electrodes 14 such that the displacement between the electrodes follows a sinusoidal path. Weld controller 28 controls electrodes 14 to follow a sinusoidal path to reduce the opening and closing times associated with the electrodes at the weld locations. Weld controller 28 controls electrodes 14 to follow a sinusoidal path such that the electrodes will be opened large enough to clear workpiece 16 at any point between weld locations. For example, the displacement between electrodes 14 follows the sinusoidal path shown in FIG. 4A when the thickness of workpiece 16 varies sinusoidally and the workpiece has a larger thickness at locations between weld locations. The displacement between electrodes 14 may also follow the sinusoidal path shown in FIG. 4A when obstacles are located at central workpiece locations between weld locations.

Figure 4A:
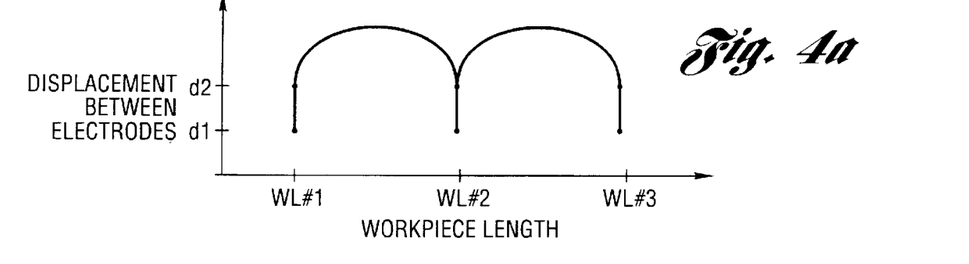
FIGS. 4A through 4D illustrate graphs showing the displacement between the electrodes as a function of the position of the weld gun with respect to the workpiece as the weld gun is being indexed between weld locations.
Figure 4B:
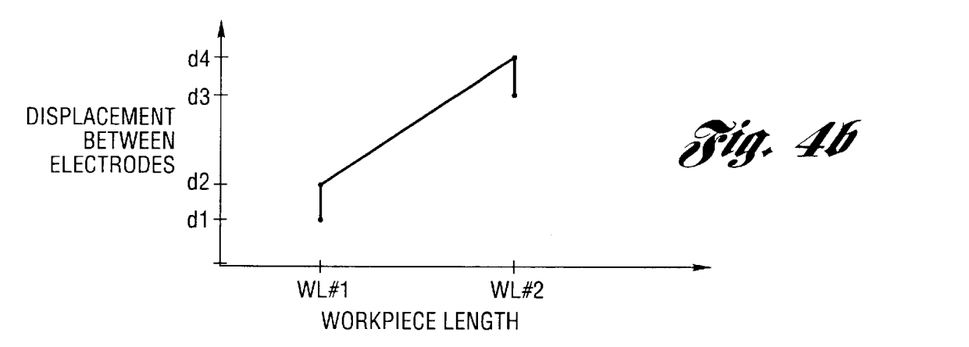
Figure 4C:
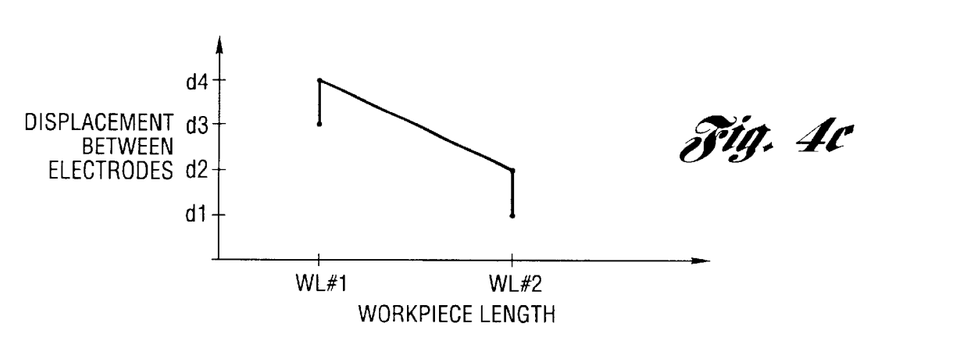

In addition to following a sinusoidal path, weld controller 28 controls the displacement between electrodes 14 to follow other linear and non-linear paths such as the linear paths shown in FIGS. 4B and 4C to accommodate workpieces having linear and non-linear varying thicknesses. FIG. 4B describes the situation in which the thickness of workpiece 16 increases linearly between weld locations. Similarly, FIG. 4C describes the situation in which the thickness of workpiece 16 decreases linearly between weld locations.

In FIG. 4B, weld gun 12 is initially at a first weld location (wl #1) and the displacement (d1) between electrodes 14 is the thickness of workpiece 16 as the electrodes are clamped down on the workpiece. After welding, once electrodes 14 have been opened a distance such that there is a sufficient displacement (d2) between them for weld gun 12 to be indexed properly weld controller 28 provides a move weld gun signal to index weld gun 12 to the second weld location (wl #2). Weld controller 28 controls electrodes 14 to continuously open until weld gun 12 reaches second weld location (wl #2) with a displacement (d4) greater than the thickness of the workpiece at the second weld location. Weld controller 28 then controls electrodes 14 to clamp down on the workpiece at the second weld location (wl #2) such that the displacement (d3) between the electrodes is equal to the thickness of the workpiece at the second weld location.

Figure 4D:
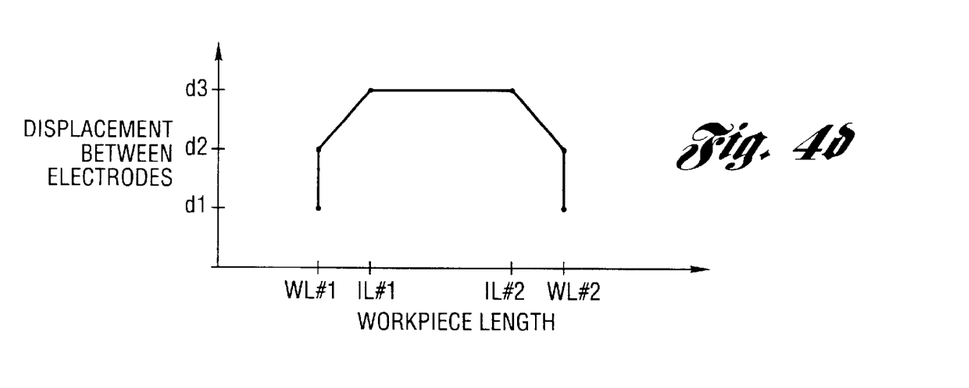

Weld controller 28 controls the rate at which electrodes 14 open as a function of the position of weld gun 12 with respect to workpiece 16 to accommodate non-linear changes in the thickness of the workpiece between weld locations. In FIG. 4D, weld gun 12 is initially at a first weld location (wl #1) and the displacement (d1) between electrodes 14 is the thickness of workpiece 16. After welding, once electrodes 14 have been opened a distance such that there is a sufficient displacement (d2) between them for weld gun 12 to be indexed properly weld controller 28 provides a move weld gun signal to index the weld gun to the second weld location (wl #2). Weld controller 28 controls electrodes 14 to open at a relatively fast rate until weld gun 12 is indexed to a first intermediate weld location (iw #1) such that the electrodes have a displacement (d3) sufficiently large to accommodate the workpiece at the first intermediate weld location. Weld controller 28 then maintains the displacement between electrodes 14 until weld gun is indexed to a second intermediate weld location (iw #2). Weld controller 28 then controls electrodes 14 to close at a relative fast rate until weld gun 12 is indexed to second weld location (wl #2) such that the electrodes have a displacement (d2). Weld controller 28 then controls electrodes 14 to close and clamp down on workpiece 16 at second weld location (wl#2) such that the displacement (d1) between the electrodes is equal to the thickness of the workpiece at the second weld location.

Thus it is apparent that there has been provided, in accordance with the present invention, a method and system for welding a workpiece at a plurality of weld locations that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A welding system for welding a workpiece at a plurality of weld locations, the system comprising:
   a weld gun having a pair of displaceable electrodes;
   a sensor operable with the weld gun for generating a welding parameter signal indicative of a welding parameter;
   a weld gun actuator for closing the electrodes to engage the workpiece and for opening the electrodes to disengage the workpiece at a weld location;
   a position controller for moving at least one of the weld gun and the workpiece such that the weld gun moves relative to the workpiece to index to each of the weld locations;
   a weld power supply for applying welding power to the electrodes to effect welding of the workpiece at the weld location; and
   a weld controller having control logic and stored data related to primary weld locations and alternate weld locations, wherein each primary weld location is associated with a respective alternate weld location, the weld controller operable with the sensor for monitoring the welding parameter as a function of the welding parameter signal, the control logic is programmed to generate a fault signal based upon the stored data and the welding parameter, wherein the weld controller provides a fault signal to weld the associated alternate weld location when a comparison of the welding parameter to stored data related to the primary weld location indicates that the workpiece has been improperly welded.

2. The system of claim 1 wherein:
the welding parameter signal is a displacement signal indicative of displacement between the electrodes.

3. The system of claim 2 wherein:
the weld controller further has stored data related to workpiece dimensions and the control logic is programmed to generate a move weld gun signal based upon the stored data and the displacement between the electrodes, wherein in response to a fault signal the weld controller compares the displacement signal as the electrodes open to stored data related to the primary weld location and provides a move weld gun signal to the position controller for indexing the weld gun from the primary weld location to the associated alternate weld location as soon as the electrodes have opened a predetermined amount sufficient to clear the workpiece when indexing to the associated alternate weld location.

4. The system of claim 3 wherein:
the position controller includes a robot operable with the weld gun for moving the weld gun relative to the workpiece, wherein the weld controller provides the move weld gun signal to the position controller for the robot to move the weld gun with respect to the workpiece.

5. The system of claim 3 wherein:
the position controller includes a workpiece indexer operable with the workpiece for moving the workpiece relative to the weld gun, wherein the weld controller provides the move weld gun signal to the position controller for the workpiece indexer to move the workpiece with respect to the weld gun.

6. The system of claim 2 wherein:
the weld controller further has stored data related to workpiece dimensions and the control logic is programmed to generate a move weld gun signal based upon the stored data and the displacement between the electrodes, wherein the weld controller compares the displacement signal as the electrodes open to stored data related to a weld location and provides a move weld gun signal to the position controller for indexing the weld gun from the weld location to the next weld location as soon as the electrodes have opened a predetermined amount sufficient to clear the workpiece when indexing to the next weld location.

7. The system of claim 2 wherein:
the control logic is programmed to generate an open weld gun signal based on the stored data and the displacement between the electrodes, wherein the weld controller provides an open weld gun signal to the weld gun actuator for opening the electrodes to disengage the workpiece when a comparison of the displacement between the electrodes to stored data related to the weld location indicates that the workpiece has been properly welded.

8. The system of claim 2 wherein:

the control logic is programmed to generate an open weld gun signal based on the stored data and the displacement between the electrodes, wherein the weld controller provides an open weld gun signal to the weld gun actuator prior to the weld power supply applying welding power to the electrodes for the weld gun actuator to open the electrodes when a comparison of the displacement between the electrodes to stored data related to the weld location indicates that the electrodes have improperly engaged the workpiece.

9. The system of claim 2 wherein:

the control logic is programmed to generate a terminate weld signal based on the stored data and the displacement between the electrodes during welding, wherein the weld controller provides a terminate weld signal to the weld power supply for terminating welding power to the electrodes when a comparison of the displacement between the electrodes to stored data related to the weld location indicates that the workpiece has been properly welded.

10. The system of claim 2 wherein:

the weld controller has stored data related to obstacle locations on the workpiece and obstacle dimensions, wherein the weld controller compares the displacement signal to stored data related to the obstacle locations and provides a move weld gun signal to the position controller to index the weld gun from a weld location to the next weld location as soon as the electrodes have opened an amount which was predetermined to be sufficient to clear the obstacles when indexing to the next weld location.

11. A welding method for welding a workpiece at plurality of weld locations, the method for use with a welding system having a weld gun provided with a pair of displaceable electrodes, a sensor operable with the weld gun for generating a welding parameter signal indicative of a welding parameter, a weld gun actuator for closing the electrodes to engage the workpiece and for opening the electrodes to disengage the workpiece, a position controller for moving at least one of the weld gun and the workpiece such that the weld gun moves relative to the workpiece to index to each of the weld locations, and a weld power supply for applying welding power to the electrodes, the method comprising:

providing a weld controller having control logic;

storing data related to primary weld locations and alternate weld locations in the weld controller, wherein each primary weld location is associated with a respective alternate weld location;

closing the electrodes to engage the workpiece at a weld location using the weld gun actuator;

applying welding power to the electrodes to effect welding of the workpiece at the weld location using the weld power supply;

monitoring the welding parameter as a function of the welding parameter signal;

programming the control logic to generate a fault signal based upon the stored data and the welding parameter;

comparing the welding parameter signal to stored data related to a primary weld location; and providing a fault signal from the weld controller to weld the associated alternate weld location when a comparison of the welding parameter to the stored data indicates that the workpiece has been improperly welded.

12. The method of claim 11 wherein:

the welding parameter signal is a displacement signal indicative of displacement between the electrodes.

13. The method of claim 12 further comprising:

storing data related to workpiece dimensions in the weld controller;

programming the control logic to generate a move weld gun signal based upon the stored data and the displacement between the electrodes;

comparing, in response to a fault signal, the displacement signal as the electrodes open to stored data related to the primary weld location; and providing a move weld gun signal from the weld controller to the position controller for indexing the weld gun from the primary weld location to the associated alternate weld location as soon as the electrodes have opened a predetermined amount sufficient to clear the workpiece when indexing to the associated alternate weld location.

14. The method of claim 12 further comprising:

storing data related to workpiece dimensions in the weld controller;

programming the control logic to generate a move weld gun signal based upon the stored data and the displacement between the electrodes;

comparing the displacement signal as the electrodes open to stored data related to a weld location; and providing a move weld gun signal to the position controller for indexing the weld gun from the weld location to the next weld location as soon as the electrodes have opened a predetermined amount sufficient to clear the workpiece when indexing to the next weld location.

15. A welding system for welding a workpiece at a plurality of weld locations, the system comprising:

a weld gun having a displaceable electrode;

a sensor operable with the weld gun for generating a welding parameter signal indicative of a welding parameter;

a weld gun actuator for closing the electrode to engage the workpiece and for opening the electrode to disengage the workpiece at a weld location;

a position controller for moving at least one of the weld gun and the workpiece such that the weld gun moves relative to the workpiece to index to each of the weld locations;

a weld power supply for applying welding power to the electrode to effect welding of the workpiece at the weld location; and a weld controller having control logic and stored data related to primary weld locations and alternate weld locations, wherein each primary weld location is associated with a respective alternate weld location, the weld controller operable with the sensor for monitoring the welding parameter as a function of the welding parameter signal, the control logic is programmed to generate a fault signal based upon the stored data and the welding parameter, wherein the weld controller provides a fault signal to weld the associated alternate weld location when a comparison of the welding parameter to stored data related to the primary weld location indicates that the workpiece has been improperly welded.

16. The system of claim 15 wherein:

the welding parameter signal is a displacement signal indicative of displacement of the electrode.

17. The system of claim 16 wherein:

the weld controller further has stored data related to workpiece dimensions and the control logic is programmed to generate a move weld gun signal based upon the stored data and the displacement of the electrode, wherein in response to a fault signal the weld controller compares the displacement signal as the electrode opens to stored data related to the primary weld location and provides a move weld gun signal to the position controller for indexing the weld gun from the primary weld location to the associated alternate weld location as soon as the electrode has opened a predetermined amount sufficient to clear the workpiece when indexing to the associated alternate weld location.

18. The system of claim 16 wherein:

the weld controller further has stored data related to workpiece dimensions and the control logic is programmed to generate a move weld gun signal based upon the stored data and the displacement of the electrode, wherein the weld controller compares the displacement signal as the electrode opens to stored data related to a weld location and provides a move weld gun signal to the position controller for indexing the weld gun from the weld location to the next weld location as soon as the electrode has opened a predetermined amount sufficient to clear the workpiece when indexing to the next weld location.

19. A welding method for welding a workpiece at plurality of weld locations, the method for use with a welding system having a weld gun provided with a displaceable electrode, a sensor operable with the weld gun for generating a welding parameter signal indicative of a welding parameter, a weld gun actuator for closing the electrode to engage the workpiece and for opening the electrode to disengage the workpiece, a position controller for moving at least one of the weld gun and the workpiece such that the weld gun moves relative to the workpiece to index to each of the weld locations, and a weld power supply for applying welding power to the electrode, the method comprising:

providing a weld controller having control logic;

storing data related to primary weld locations and alternate weld locations in the weld controller, wherein each primary weld location is associated with a respective alternate weld location;

closing the electrode to engage the workpiece at a weld location using the weld gun actuator;

applying welding power to the electrode to effect welding of the workpiece at the weld location using the weld power supply;

monitoring the welding parameter as a function of the welding parameter signal;

programming the control logic to generate a move weld gun signal based upon the stored data and the welding parameter;

comparing the welding parameter signal to stored data related to a primary weld location; and providing a fault signal from the weld controller to weld the associated alternate weld location in response to a comparison of the welding parameter to stored data related to the primary weld location indicating that the workpiece has been improperly welded.

20. The method of claim 19 wherein:

the welding parameter signal is a displacement signal indicative of displacement of the electrode.

21. The method of claim 20 further comprising:

storing data related to workpiece dimensions in the weld controller;

programming the control logic to generate a move weld gun signal based upon the stored data and the displacement of the electrode;

comparing, in response to a fault signal, the displacement signal as the electrode opens to stored data related to the primary weld location; and providing a move weld gun signal from the weld controller to the position controller for indexing the weld gun from the primary weld location to the associated alternate weld location as soon as the electrode has opened a predetermined amount sufficient to clear the workpiece when indexing to the associated alternate weld location.

22. The method of claim 20 further comprising:

storing data related to workpiece dimensions in the weld controller;

programming the control logic to generate a move weld gun signal based upon the stored data and the displacement of the electrode;

comparing the displacement signal as the electrodes open to stored data related to a weld location; and providing a move weld gun signal to the position controller for indexing the weld gun from the weld location to the next weld location as soon as the electrode has opened a predetermined amount sufficient to clear the workpiece when indexing to the next weld location.

* * * * *